US010353095B2

(12) United States Patent
Sun et al.

(10) Patent No.: US 10,353,095 B2
(45) Date of Patent: Jul. 16, 2019

(54) SYSTEM AND METHOD FOR PRISMATIC SEISMIC IMAGING

(71) Applicant: CHEVRON U.S.A. INC., San Ramon, CA (US)

(72) Inventors: Yonghe J. Sun, Cypress, TX (US); Weihong Fei, Houston, TX (US); Craig A. Barker, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/191,670

(22) Filed: Jun. 24, 2016

(65) Prior Publication Data
US 2017/0010374 A1    Jan. 12, 2017

Related U.S. Application Data

(60) Provisional application No. 62/190,869, filed on Jul. 10, 2015.

(51) Int. Cl.
*G01V 1/30* (2006.01)
*G01V 1/36* (2006.01)

(52) U.S. Cl.
CPC ............ *G01V 1/306* (2013.01); *G01V 1/36* (2013.01)

(58) Field of Classification Search
CPC .................................................. G01V 1/306
USPC ................................................................ 702/16
See application file for complete search history.

(56) References Cited

U.S. PATENT DOCUMENTS

| 7,453,764 | B2 * | 11/2008 | Cavalca | G01V 1/003 |
| | | | | 367/37 |
| 8,743,115 | B1 * | 6/2014 | Mallet | G01V 1/302 |
| | | | | 345/419 |
| 2014/0071791 | A1 * | 3/2014 | Li | G01V 1/282 |
| | | | | 367/73 |
| 2014/0307928 | A1 * | 10/2014 | Jing | G01V 1/301 |
| | | | | 382/109 |

OTHER PUBLICATIONS

Karine Broto et al., Towards the tomographic inversion of prismatic reflections, SED Int'l Exposition and Annual Meeting, San Antonio, Texas, Sep. 9-14, 2001.
Maud Cavalca et al., Prismatic reflections for the delineation of salt bodies, SEG/Houston 2005 Annual Meeting, pp. 2550-2553.
(Continued)

*Primary Examiner* — Ricky Ngon
(74) *Attorney, Agent, or Firm* — Marie L. Clapp

(57) ABSTRACT

A method is described for seismic imaging of complex subsurface volumes using prismatic seismic energy. The method receives a seismic dataset and an earth model. The earth model is perturbed such that prismatic reflections will generate perturbed seismic amplitudes in a target area and seismic imaging is performed using the perturbed model. A second seismic image is generated using a second earth model; the second earth model may be the original earth model or a second perturbed model wherein the perturbation generates different seismic amplitudes in the target area. The two seismic images are differenced to generate a prismatic seismic image that can be used to identify geologic features that are poorly illuminated in conventional imaging. The method may be executed by a computer system.

15 Claims, 6 Drawing Sheets

(56) References Cited

OTHER PUBLICATIONS

Wei Dai et al., Reverse Time Migration of Prism Waves for Salt Flank Delineation, 2013 SEG DOI SEG Houston 2013 Annual Meeting, pp. 3861-3865, web http://dx.doi.org/10.1190/segam2013-0414.1.

Yunfeng Li et al., Prismatic wave imaging with dual flood RTM, 2011 SEG SEG San Antonio 2011 Annual Meeting, pp. 3290-3294.

\* cited by examiner

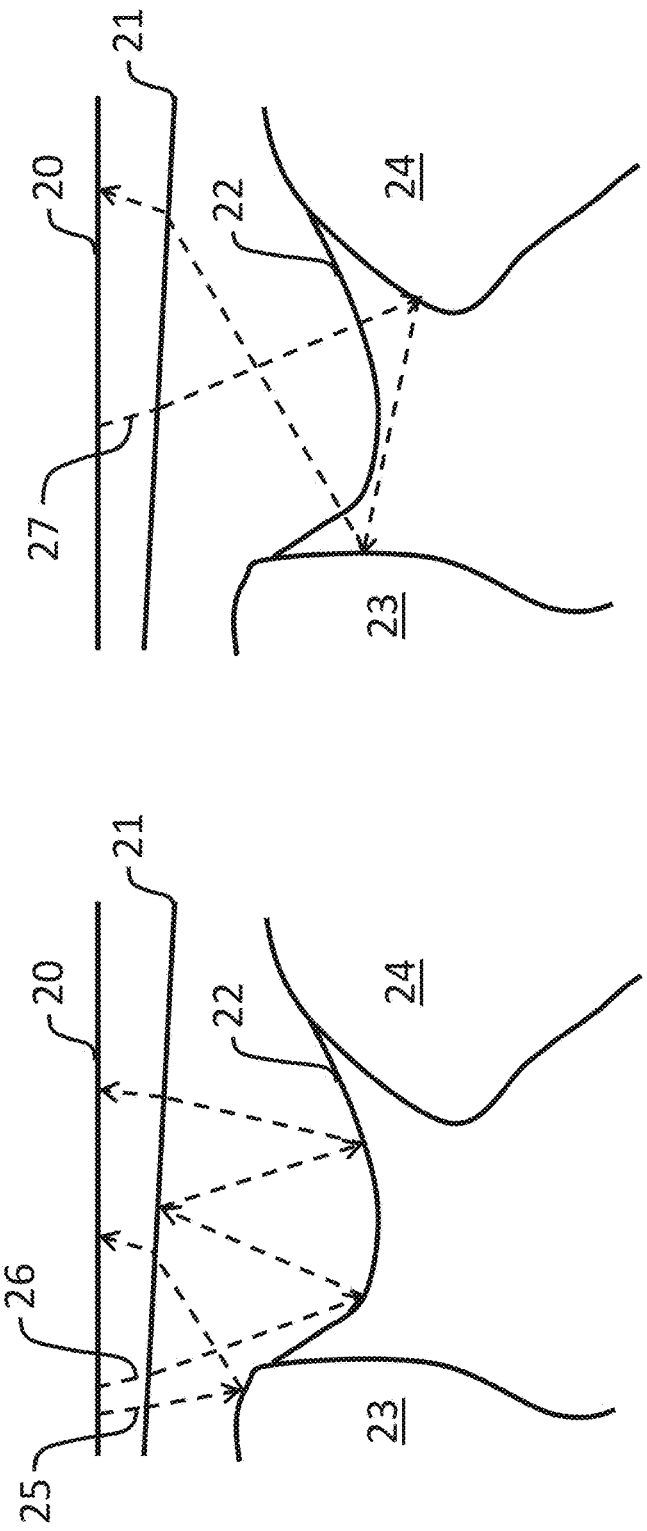

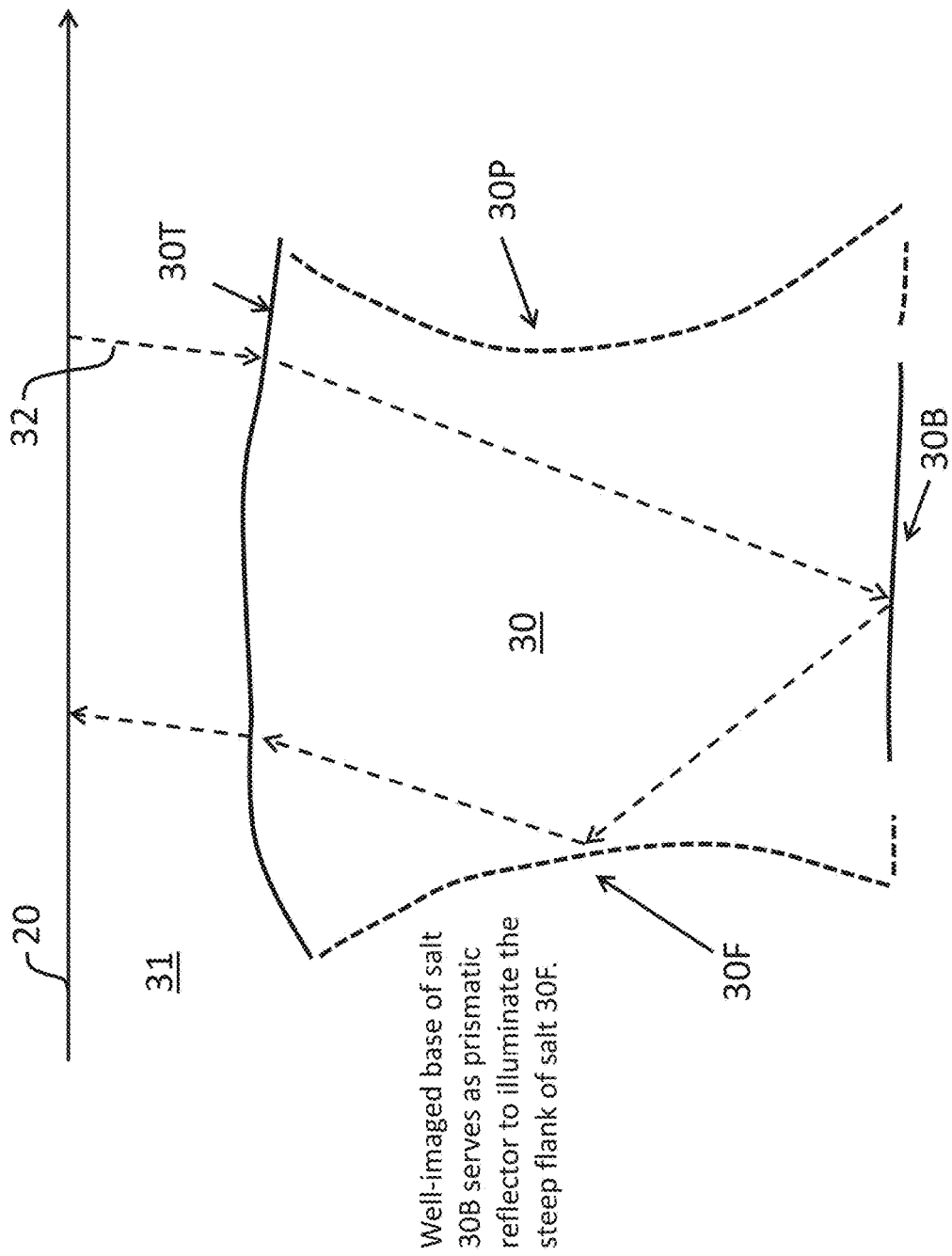

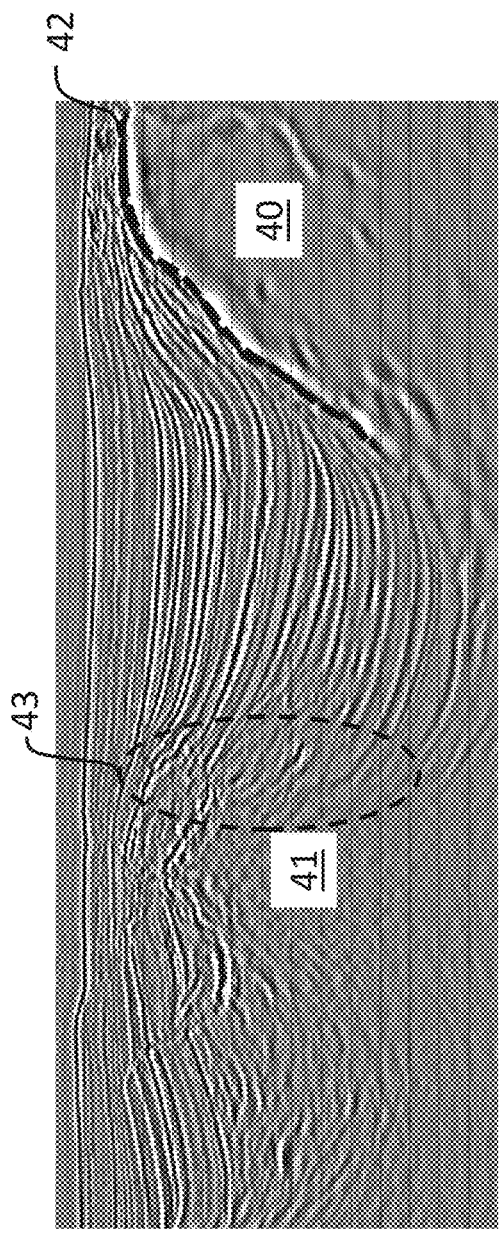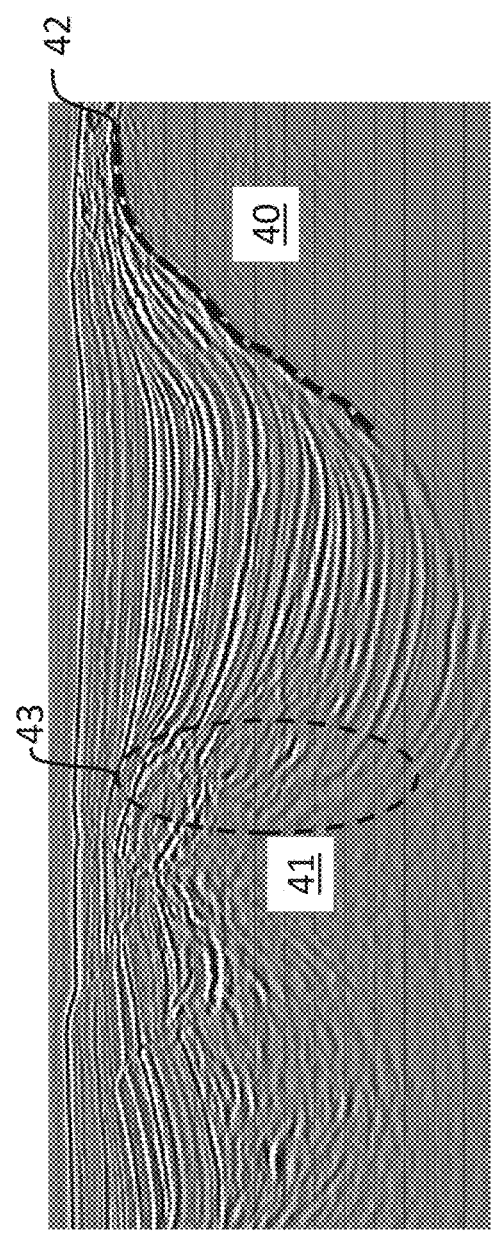

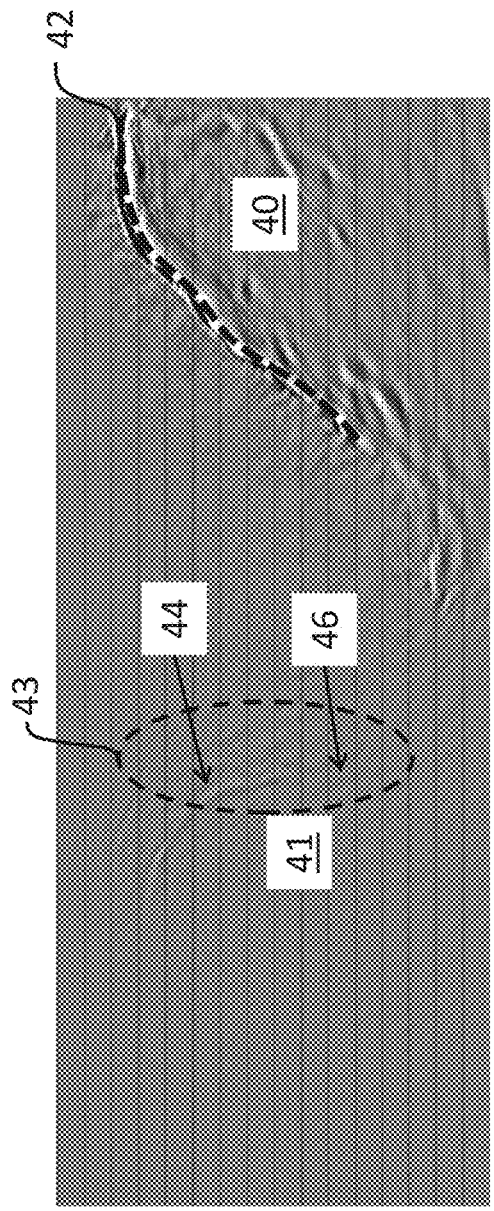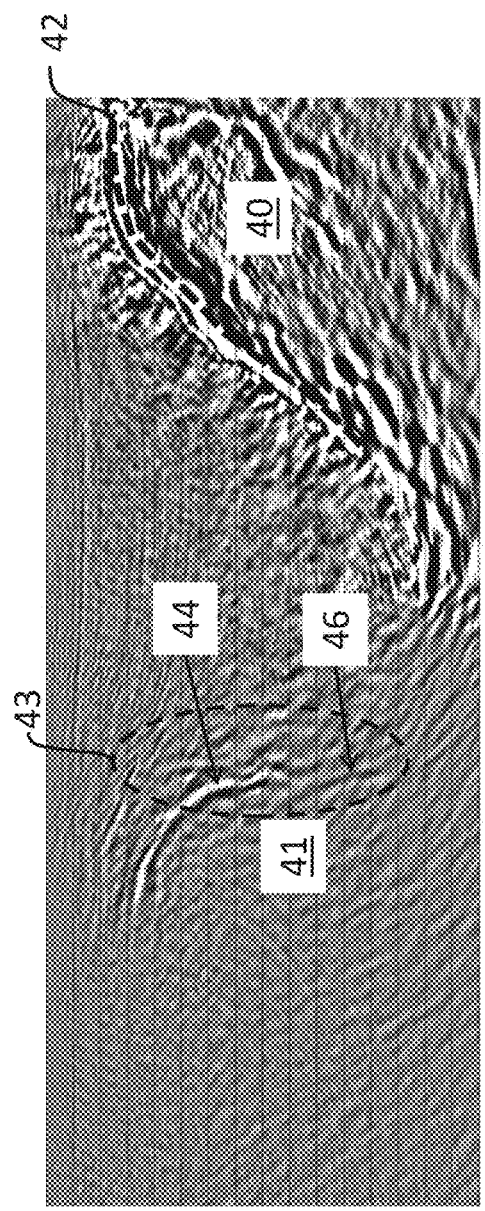
FIG. 4C
FIG. 4D

SYSTEM AND METHOD FOR PRISMATIC SEISMIC IMAGING

CROSS-REFERENCE TO RELATED APPLICATIONS

This application claims priority from provisional U.S. Patent Application 62/190,869 filed Jul. 10, 2015.

STATEMENT REGARDING FEDERALLY SPONSORED RESEARCH OR DEVELOPMENT

Not applicable.

TECHNICAL FIELD

The disclosed embodiments relate generally to techniques for deriving seismic images of the subsurface from geophysical seismic data and, in particular, to a method of generating a seismic image of the subsurface based on prismatic energy arrivals.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. This imaging may involve propagation of wavefields through a velocity model of the subsurface, also called forward modeling. In complex subsurface areas, such as near and below salt bodies, seismic images often suffer uneven illumination or lack of illumination due to the sharp impedance contrast between salt and the surrounding sediments. Additionally, subsurface features such as steeply dipping top of salt and salt flanks may reflect seismic energy in a direction that is not directly recordable by the seismic sensors.

There exists a need for improved seismic images that will allow better seismic interpretation of geobodies that will, in turn, allow further improved imaging and interpretation of potential hydrocarbon reservoirs.

SUMMARY

In accordance with some embodiments, a method of seismic imaging may include receiving a seismic dataset representative of a subsurface volume of interest and an earth model, perturbing a portion of the earth model to generate a first perturbed earth model such that prismatic reflections will generate perturbed seismic amplitudes in a target area; performing seismic imaging of the seismic dataset using the first perturbed earth model to generate a perturbed seismic image wherein both a non-prismatic background image and kinematics of a prismatic image remain unperturbed; performing seismic imaging of the seismic dataset using a second earth model to generate a second seismic image; differencing, the perturbed seismic image and the second seismic image to generate a seismic image in which the background image is removed by the differencing and prismatic contributions remain; and identifying geologic features based on the prismatic seismic image that may be too weak for interpretation before the differencing. The second earth model may be the original earth model or an earth model that has been perturbed differently than the first perturbed earth model. The perturbation of the portion of the earth model includes changing an impedance contrast at a reflector for the prismatic energy generation in some way, either directly at the reflector, by changing the properties of the model below the reflector (e.g. water flood, sediment flood, and/or salt flood), adding a scaled image of some type, and/or smoothing.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIGS. 2A and 2B are diagrams of a subsurface with seismic raypaths illustrating different seismic energy types;

FIG. 3 is another diagram of a subsurface including seismic raypaths within a salt body; and FIG. 4A is an example of a seismic image created with a salt flood velocity model showing some areas poorly illuminated;

FIG. 4B is an example of a seismic image created with a water flood velocity model showing some areas poorly illuminated;

FIG. 4C is a result of an embodiment of the present invention;

FIG. 4D is a result of an embodiment of the present invention with the amplitudes multiplied for visibility.

Like reference numerals refer to corresponding parts throughout the drawings.

DETAILED DESCRIPTION OF EMBODIMENTS

Figure 1:
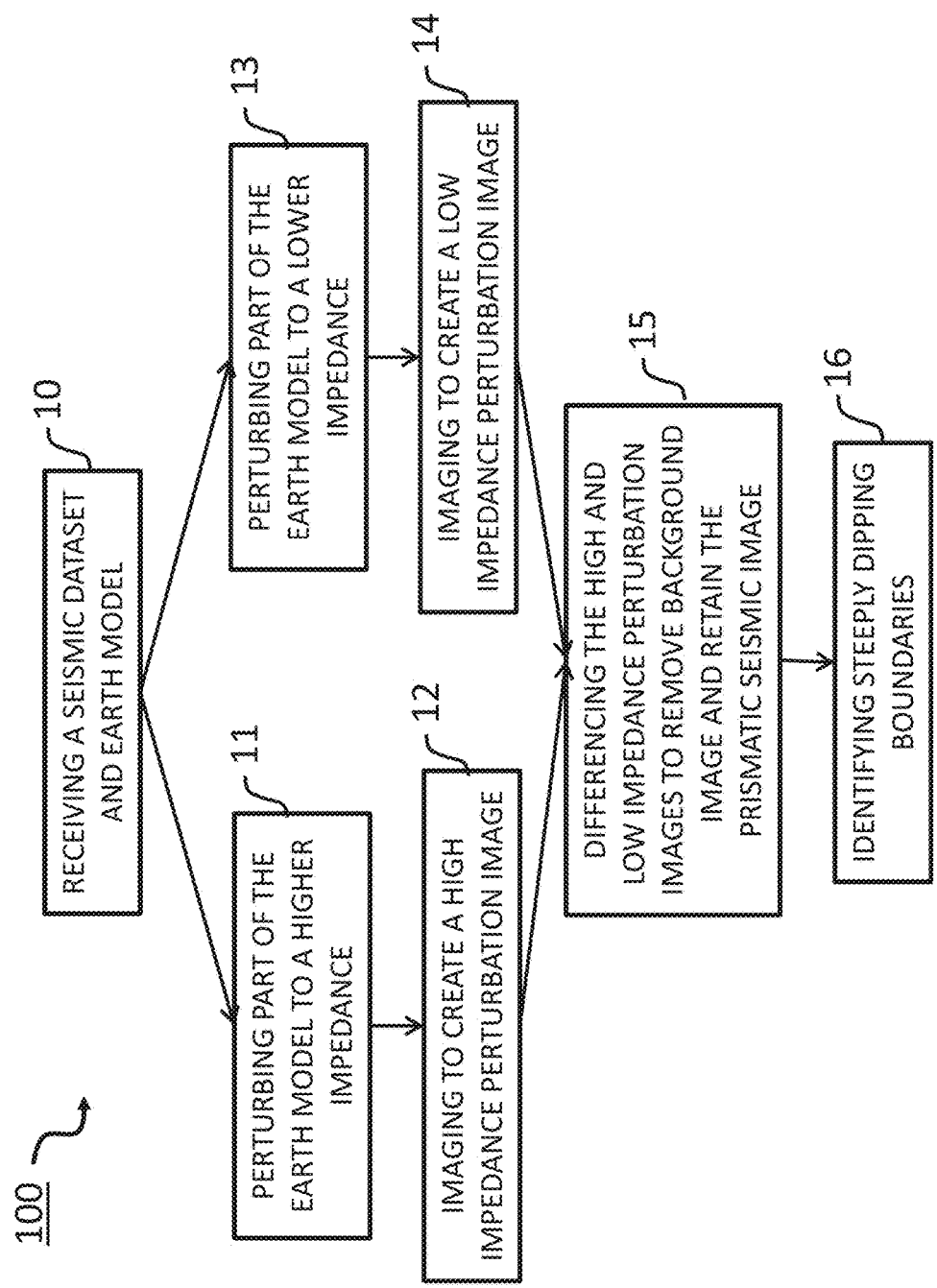
FIG. 1 illustrates a flowchart of a method of seismic imaging using two-stage reverse time migration, in accordance with some embodiments.

Described below are methods, systems, and computer readable storage media that provide a manner of seismic imaging. These embodiments are designed to be of particular use for seismic imaging of subsurface volumes in geologically complex areas such as under or near salt bodies.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. Processing seismic data and generating seismic images is a very complicated procedure. This is particularly true in areas of geologic complexity, such as near high-contrast rock boundaries (e.g. salt bodies) where the boundaries (e.g. salt flanks) are steeply dipping.

Imaging steeply dipping salt tops or flanks such as those found in the Gulf of Mexico can be difficult, especially for regions next to laterally narrow small sedimentary basins. One reason for the difficulty in imaging a steeply dipping salt top or flank is that it tends to require far-offsets (i.e. large distances between the seismic source and seismic receivers) which results in weaker amplitudes in the seismic energy arrivals. In addition, adjacent salt bodies can prevent the direct illumination of a steep flank from the surface. Paradoxically, the presence of the adjacent salt as a strong reflector can provide opportunities to illuminate steep salt flanks indirectly by the reflections of the adjacent salt-sediment boundaries. The illumination of a steep flank involves two or more bounces, once at the flank itself and one or more additional bounces from a nearby strong reflector such as the top of a dipping adjacent salt. To distinguish this imaging from conventional imaging that uses primary energy that involves only one bounce at the subsurface, this mode of imaging is referred to as prismatic imaging. Prismatic imaging should also be distinguished from imaging of multiples. Multiples usually refer to one or more round-trip bounces between two or more strong, and often nearly parallel, reflectors. FIGS. 2A and 2B demonstrate the different seismic raypaths that are used in each of these types of imaging. Both figures include the surface 20, two sediment boundaries 21 and 22, and salt bodies 23 and 24. FIG. 2A shows a primary energy raypath 25 and a multiple energy raypath 26. FIG. 2B shows a prismatic energy raypath 27 which has reflected from the top of salt body 24 to illuminate the steep flank of salt body 23. FIG. 3 shows another example of prismatic illumination. In FIG. 3, a salt body 30 is located below and surrounded by sediment 31. In this example, the salt top 30T and at least part of the salt bottom 30B are well illuminated and may be imaged with conventional seismic imaging methods. However, the steeply dipping salt flanks 30P and 30F are not illuminated by primary energy or multiple energy. Steeply dipping salt flank 30F can be illuminated by prismatic energy raypath 32 which has passed through the salt body and reflected at the salt bottom 30B. Utilizing prismatic energy for imaging has received increasing attention in recent years.

The present invention includes embodiments of a method and system for producing seismic images using prismatic energy. While prismatic imaging provides additional illumination opportunities through secondary bounces, the prismatic contributions sometimes can be too weak to be seen. The weak prismatic images are oftentimes obscured by strong primary images and migration noise, including multiples. The present invention addresses this issue by illuminating an imaging target twice, using two different earth models to generate two different images. We create the models in such a way that the different models will image the target reflector with prismatic waves of different amplitude, phase, or polarity, but the same propagation time. The models are such that the images have nearly identical strong background image corresponding to the primaries and other non-prismatic contributions but different prismatic contributions. The prismatic contributions in these images appear in the same image locations but are different from each other in amplitude (with zero-amplitude being a special case), phase, and/or polarity. Subtraction of a pair of such images removes the strong background image and reveals the prismatic image that can be weaker by orders of magnitude than the background image. There are many ways to generate models for this purpose. The two models should have the same imaging velocities in regions where waves corresponding to the primaries and prismatic waves propagate and the two models differ in reflectivity where the prismatic waves are generated.

FIG. 4A is a seismic image from a real subsurface volume of interest. In this 2D seismic image, a salt body 40 with a well-illuminated and well-imaged salt top 42 is on the right and a second salt body 41 is just left of center. During imaging, the salt body 40 was assigned (or "flooded") a salt velocity, for example around 4500 m/s. In this conventional seismic image, the steeply dipping flank of salt body 41 is not fully illuminated by the primary seismic energy and thus cannot be seen easily in the image. The flank should be somewhere in region 43 but it is difficult to accurately interpret this image to pick the flank. As explained previously, seismic energy reflected from salt top 42 can illuminate the flank of salt body 41 but such so-called prismatic energy will have much weaker amplitudes in the recorded seismic data and the conventional seismic image.

In order to see better, and sometimes to see at all, prismatic images, it is necessary to alter the strength of the prismatic images relative to those associated with the primary images and migration noise. The solution taught by the present invention accomplishes this by imaging with two or more different earth models. The models are different in the impedance contrasts (as results of contrasts in, e.g., velocity, density, or anisotropy) at the location of the secondary bounces (e.g., at the top of the adjacent salt top) so they make prismatic contributions different in phase and/or amplitude, but with the same kinematics, to prismatic imaging. The models are such that background images that do not include these secondary bounces would remain substantially the same for these different models. Taking the difference between images created with a pair of these models will substantially remove the strong background image. The much weaker image (sometimes 10~20 times weaker) due to prismatic contributions will remain in the difference image.

An embodiment of a prismatic imaging method 100 is shown in FIG. 1. At operation 10, a seismic dataset representative of the subsurface volume of interest is received. This seismic dataset includes arrivals from primary energy, multiple energy, and prismatic energy. An earth model representative of the subsurface volume of interest is also received. The earth model includes at least one of seismic velocity (P- and/or S-wave velocity, depending on the seismic data type), and, optionally, density, attenuation, and anisotropy. The subsurface volume of interest may include two or more geobodies such as salt with steeply dipping boundaries (e.g. salt flanks). The earth model should include at least one strong reflector capable of reflecting seismic energy so that it encounters and reflects from (i.e. illuminates) a steeply dipping boundary elsewhere in the earth model; this is the so-called prismatic energy. While the examples herein show steeply dipping flanks for illustration purposes, the prismatic imaging described in this invention is not limited to imaging of steeply dipping reflectors. It can be applied whenever prismatic energies provide additional or complementary illumination.

The method then proceeds to perturb a portion of the earth model that is likely to be a strong reflector for prismatic energies. In this embodiment, at least two different perturbed models are created by perturbing a portion of the earth model to have a higher impedance 11 and the same portion perturbed to have a lower impedance 13. The perturbation is in the medium not containing the prismatic reflections. The high and low perturbations are relative and are designed so that the prismatic reflections have different amplitudes, but the same kinematics (i.e. same propagation times). For example, if the earth model includes two adjacent salt bodies and the dipping top of one salt generates the prismatic reflections that illuminate the other salt body, one way to perturb the earth model is to flood one of the salt bodies, the one that generates prismatic reflections and has been well imaged without the need of prismatic illumination, with the velocity of salt, sediment, or water. Illustrating this with FIG. 4A and FIG. 4B, reflections from the salt top 42 can illuminate the flank of salt body 41. The salt body 40 can have its impedance set as a very high value as seen in FIG. 4A (e.g., using a salt velocity), a mid-range value (e.g., using a sediment velocity), or a low value as seen in FIG. 4B (e.g., using a water velocity). There will be at least two different earth models wherein the difference is the seismic impedance set in the salt body 40. In another embodiment, the perturbations may simply change the impedance contrast at the top of that salt in two different amounts. Referring again to FIG. 4, the impedance contrast for the two different earth models would be different at salt top 42. In yet another embodiment, the perturbation may be adding at least two differently scaled images of some type (e.g., the result of a migration or impedance inversion) to the sediment flood, for example, with one using a positive scale and other a negative scale within a band near the top of salt (near salt top 42). In a further embodiment, another possible perturbation is to smooth the salt flood by different amounts. Any change to the impedance at one or more reflectors (e.g., a high-contrast boundary such as sediment-to-salt at a dipping top of salt) that causes seismic energy to illuminate the steeply dipping boundaries (e.g., the flank of an adjacent salt) of interest is within the scope of the perturbation operations 11 and 13.

In an alternative embodiment, rather than creating two or more perturbed models it may be possible to generate one perturbed model that will create prismatic amplitudes sufficiently different from the original seismic amplitudes. In this embodiment, the original earth model may be used in place of the second perturbed model for the remainder of method 100.

After at least two differently perturbed earth models have been generated, each of the perturbed earth models is used for seismic imaging. The two models with high impedance perturbation image 12 and the low impedance perturbation image 14 as a specific embodiment will be used for illustration. The seismic imaging may be accomplished by prestack depth migration, such as prestack Kirchhoff migration and Gaussian beam migration based on raytracing and reverse time migration based on finite-difference solution of the wave equations. This generates at least two different seismic images wherein the background images (those due to primary energy) are substantially the same but the images from the prismatic energy are different. The seismic image of FIG. 4A is one seismic image generated with the original earth model with a salt velocity in salt body 40. There are prismatic reflections in region 43 but they are too weak to be seen. The seismic image in FIG. 4B was generated using a perturbed earth model were the salt body 40 was given a water velocity and appears very similar to FIG. 4A, with weak prismatic reflections existing in the same location within region 43 but with different amplitudes, phase, and/or polarities as compared to the weak prismatic reflections in FIG. 4A.

Taking the difference of the two perturbation images 15, in principle, removes the common background image. In addition, if the way the perturbations were done reversed the polarity of one of the prismatic energy arrivals, the differencing will actually enhance the amplitude of the prismatic image, visible or not, in either of the two images before the differencing. This can be seen in FIG. 4C which, in addition to features 40, 41, 42, and 43 as seen in FIG. 4A and FIG. 4B, has the weak prismatic energy images 44 and 46. Prismatic energy image 44 is approximately one-tenth the strength of seismic event 42 while prismatic energy image 46 is approximately one-fortieth the strength of seismic event 42. FIG. 4D is the same as FIG. 4C except all of the amplitudes have been multiplied by 10 so that the prismatic energy images 44 and 46 are easier to see.

Once the prismatic image is revealed by the differencing, it may be used to identify steeply dipping boundaries that were obscured by the much stronger primary images. These steeply dipping boundaries are useful for refining the earth model to improve subsequent imaging (of, e.g., the salt base and subsalt reflectors), improving seismic interpretation, and identifying potential seals for hydrocarbon reservoirs. This will enable improved hydrocarbon reservoir delineation, improved reserves estimation, and improved well planning.

Figure 5:
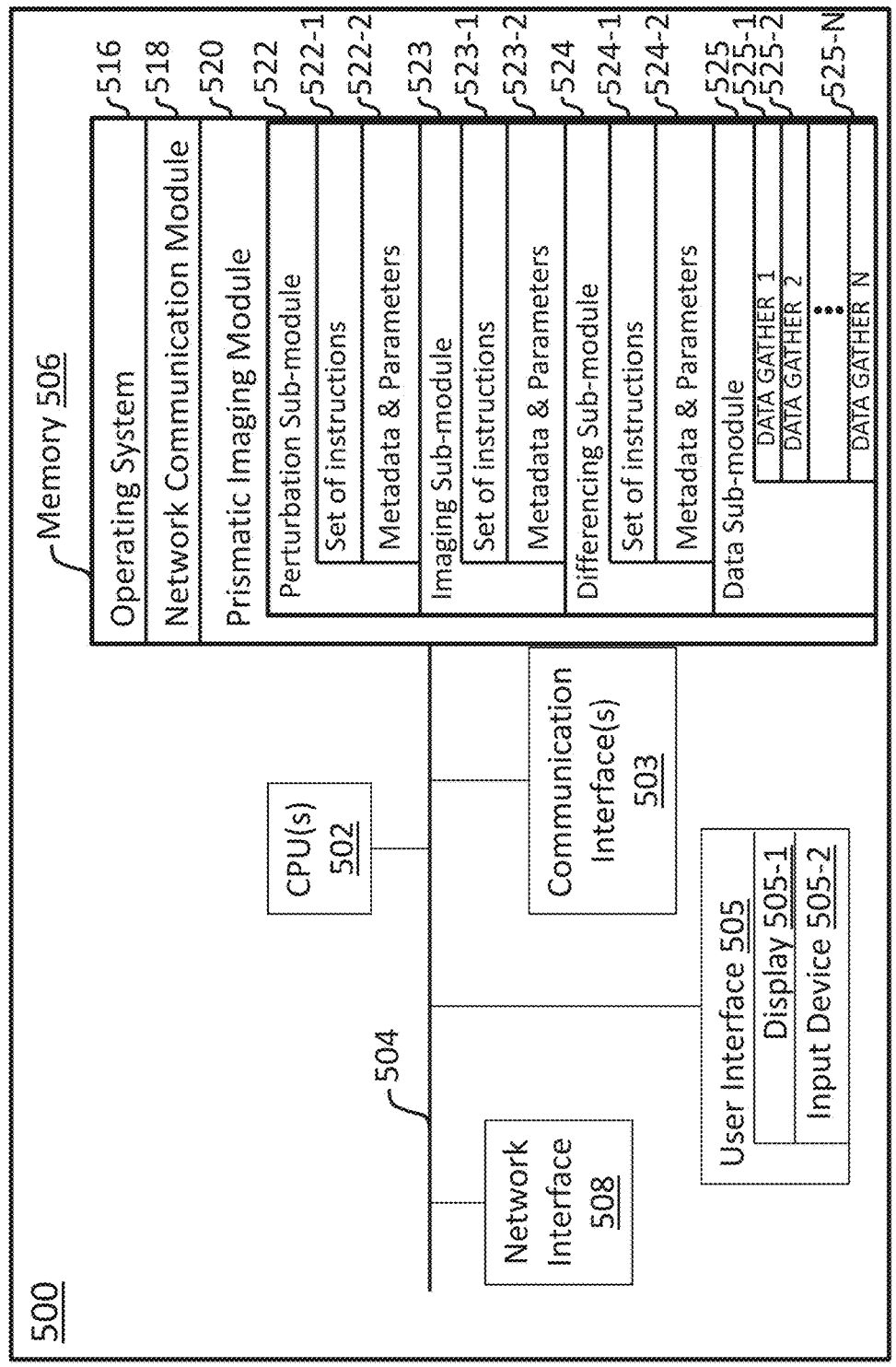
FIG. 5 is a block diagram illustrating a seismic imaging system, in accordance with some embodiments.

FIG. 5 is a block diagram illustrating a seismic imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the prismatic imaging module 520 executes the operations of method 100. Prismatic imaging module 520 may include data sub-module 525, which handles the seismic dataset including seismic gathers 525-1 through 525-N. This seismic data is supplied by data sub-module 525 to other sub-modules.

Perturbation sub-module 522 contains a set of instructions 522-1 and accepts metadata and parameters 522-2 that will enable it to execute operations 11 and 13 of method 100. The imaging sub-module 523 contains a set of instructions 523-1 and accepts metadata and parameters 532-2 that will enable it to contribute to operations 12 and 14 of method 100. The differencing sub-module 524 contains a set of instructions 524-1 and accepts metadata and parameters 524-2 that will enable it to execute at least operation 15 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for improving seismic imaging based on prismatic reflections, comprising:
   a. receiving, at a computer processor, a seismic dataset representative of a subsurface volume of interest and an earth model of the subsurface volume of interest;
   b. perturbing, via the computer processor, a portion of the earth model to generate a first perturbed earth model such that the prismatic reflections will generate perturbed seismic amplitudes in a target area wherein the target area includes steeply dipping high-contrast rock boundaries;

c. performing seismic imaging, via the computer processor, of the seismic dataset using the first perturbed earth model to generate a perturbed seismic image wherein both a non-prismatic background image and kinematics of a prismatic image remain unperturbed;

d. performing seismic imaging, via the computer processor, of the seismic dataset using a second earth model to generate a second seismic image;

e. differencing, via the computer processor, the perturbed seismic image and the second seismic image to generate a prismatic seismic image in which non-prismatic background image contributions are removed and prismatic contributions are strengthened; and f. identifying the steeply dipping high-contrast rock boundaries based on the prismatic seismic image that may be too weak for interpretation before the differencing.

2. The method of claim 1 wherein the second earth model is the earth model of the subsurface volume of interest with no perturbations.

3. The method of claim 1 wherein the second earth model is an earth model generated by perturbing the portion of the earth model such that the prismatic reflections will generate different perturbed seismic amplitudes in the target area.

4. The method of claim 3 wherein the perturbing the portion of the earth model includes changing an impedance contrast at a reflector for the prismatic energy generation to create a first perturbation and wherein the second earth model is generated by changing the impedance contrast at the reflector differently from the first perturbation to create a second perturbation.

5. The method of claim 4 wherein the first perturbation and the second perturbation are of opposite polarities.

6. The method of claim 3 wherein the second earth model is generated by a salt flood, a sediment flood, or a water flood of a salt body that serves as the generator of the prismatic reflections.

7. The method of claim 3 wherein the perturbing the portion of the earth model includes adding a scaled image to a sediment flood to create a first perturbation and wherein the second earth model is generated by adding a differently scaled image to a sediment flood to create a second perturbation wherein the scaled image and the differently scaled image is created by scaling an image generated by one of a migration, a waveform inversion, or an impedance inversion.

8. The method of claim 7 wherein the first perturbation and the second perturbation are created with scales of opposite polarities.

9. The method of claim 3 wherein the perturbing the portion of the earth model includes smoothing a prismatic reflection-generating sharp boundary to create a first perturbation and wherein the second earth model is generated by smoothing the prismatic reflection-generating sharp boundary differently to create a second perturbation.

10. The method of claim 1 wherein the perturbing the portion of the earth model includes changing an impedance contrast at one or more reflectors for the prismatic energy generation.

11. The method of claim 1 wherein the perturbing the portion of the earth model includes a salt flood, a sediment flood, or a water flood of a salt body that serves as the generator of the prismatic reflections.

12. The method of claim 1 wherein the perturbing the portion of the earth model includes adding a scaled image wherein the scaled image is created by scaling an image generated by one of a migration, a waveform inversion, or an impedance inversion.

13. The method of claim 1 wherein the perturbing the portion of the earth model includes smoothing a prismatic reflection-generating sharp boundary.

14. A computer system configured for improving seismic imaging based on prismatic reflections, comprising:

one or more processors;

memory; and one or more programs, wherein the one or more programs are stored in the memory and configured to be executed by the one or more processors, the one or more programs including instructions that when executed by the one or more processors cause the device to execute:

a. receiving a seismic dataset representative of a subsurface volume of interest and an earth model of the subsurface volume of interest;

b. perturbing a portion of the earth model to generate a first perturbed earth model such that the prismatic reflections will generate perturbed seismic amplitudes in a target area wherein the target area includes steeply dipping high-contrast rock boundaries;

c. performing seismic imaging of the seismic dataset using the first perturbed earth model to generate a perturbed seismic image wherein both a non-prismatic background image and kinematics of a prismatic image remain unperturbed;

d. performing seismic imaging of the seismic dataset using a second earth model to generate a second seismic image;

e. differencing the perturbed seismic image and the second seismic image to generate a prismatic seismic image in which non-prismatic background image contributions are removed and prismatic contributions are strengthened; and f. identifying the steeply dipping high-contrast rock boundaries based on the prismatic seismic image that may be too weak for interpretation before the differencing.

15. A non-transitory computer readable storage medium storing one or more programs, the one or more programs comprising instructions, which when executed by an electronic device with one or more processors and memory, cause the device to execute a method for improving seismic imaging based on prismatic reflections comprising:

a. receiving a seismic dataset representative of a subsurface volume of interest and an earth model of the subsurface volume of interest;

b. perturbing a portion of the earth model to generate a first perturbed earth model such that the prismatic reflections will generate perturbed seismic amplitudes in a target area wherein the target area includes steeply dipping high-contrast rock boundaries;

c. performing seismic imaging of the seismic dataset using the first perturbed earth model to generate a perturbed seismic image wherein both a non-prismatic background image and kinematics of a prismatic image remain unperturbed;

d. performing seismic imaging of the seismic dataset using a second earth model to generate a second seismic image;

e. differencing the perturbed seismic image and the second seismic image to generate a prismatic seismic image in which non-prismatic background image contributions are removed and prismatic contributions are strengthened; and f. identifying the steeply dipping high-contrast rock boundaries based on the prismatic seismic image that may be too weak for interpretation before the differencing.

\* \* \* \* \*